United States Patent [19]

Battocchio

[11] Patent Number: 5,662,429

[45] Date of Patent: Sep. 2, 1997

[54] EXTENDIBLE ROD

[75] Inventor: Gilberto Battocchio, Bassano Del Grappa, Italy

[73] Assignee: Lino Manfrotto & Co., S.p.A., Bassano Del Grappa (VI), Italy

[21] Appl. No.: 438,469

[22] Filed: May 10, 1995

[51] Int. Cl.[6] .................................................. B25G 3/00
[52] U.S. Cl. ........................... 403/377; 403/109; 403/83; 403/321; 248/354.5
[58] Field of Search ................................... 403/109, 110, 403/83, 321, 322, 373, 374, 376, 377; 285/298, 302; 248/285, 354.5; 254/116, 133 A

[56] References Cited

U.S. PATENT DOCUMENTS

| | | | |
|---|---|---|---|
| 2,413,342 | 12/1946 | Symons | 248/354.5 |
| 2,468,484 | 4/1949 | Clark | 248/354.5 X |
| 2,777,660 | 1/1957 | Albrecht | 248/354.5 |
| 2,820,626 | 1/1958 | Hedeen | 248/354.5 X |
| 3,090,600 | 5/1963 | Smith | 403/109 X |
| 3,110,506 | 11/1963 | O'Brien | |
| 4,362,415 | 12/1982 | Metz et al. | 403/109 |
| 5,186,429 | 2/1993 | Linnepe et al. | 403/109 X |

FOREIGN PATENT DOCUMENTS

| | | |
|---|---|---|
| 652142 | 12/1964 | Belgium . |
| 0427584 | 5/1991 | European Pat. Off. . |
| 9200083 | 2/1992 | Germany . |

Primary Examiner—Blair Johnson
Assistant Examiner—Bruce A. Lev
Attorney, Agent, or Firm—Sughrue, Mion, Zinn, Macpeak & Seas

[57] ABSTRACT

An extendible rod comprises two rod-shaped elements slidable telescopically inside each other, and an expander device for locking the rod-shaped elements against sliding in an extended position of the rod, wherein the expander device comprises a linkage acting between first and second constraint members, being each associated with a respective one of the rod-shaped elements to drive them through a stroke of mutual separation, and wherein the length of that stroke may be adjusted.

8 Claims, 2 Drawing Sheets

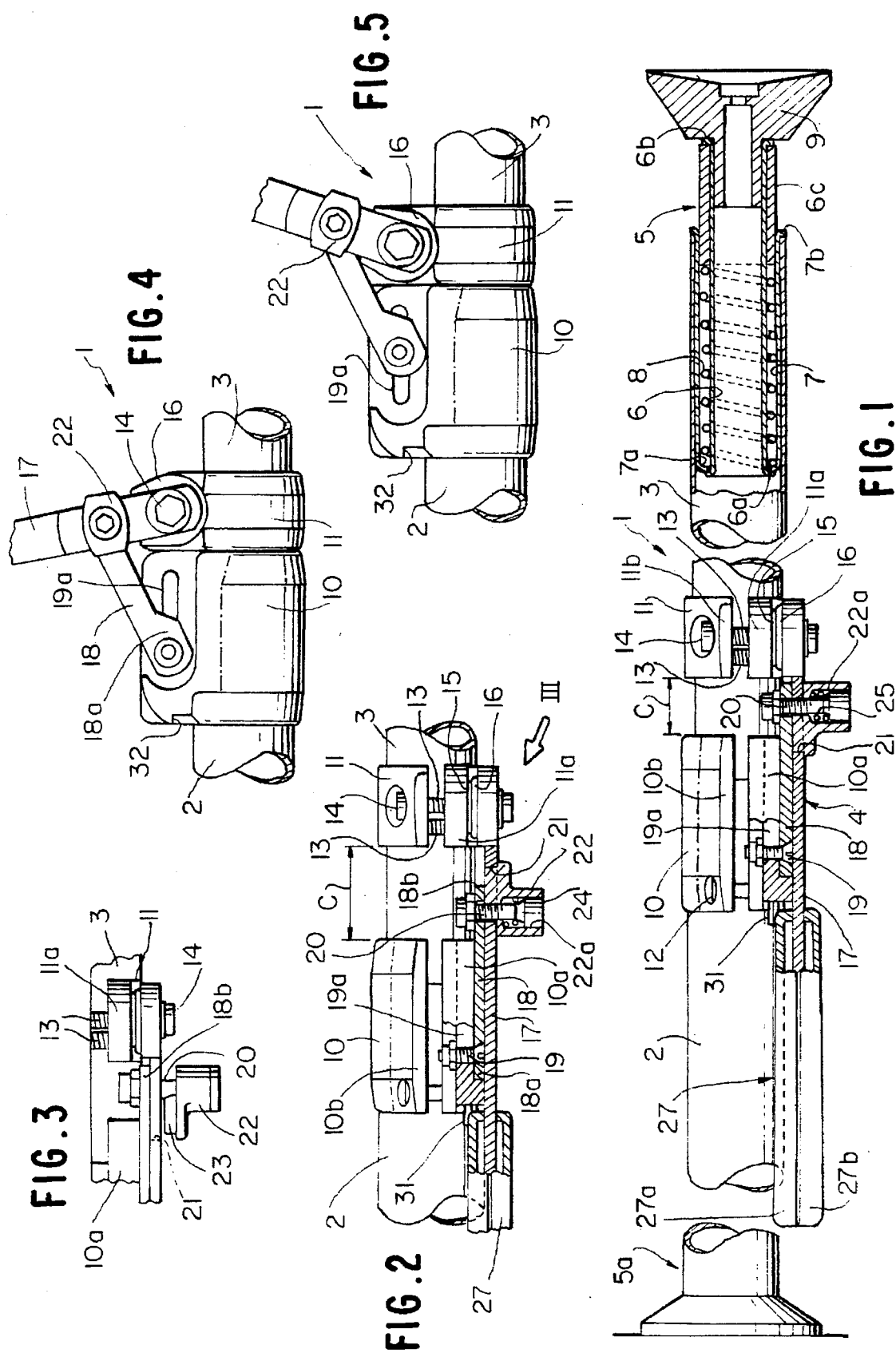

EXTENDIBLE ROD

BACKGROUND OF THE INVENTION

This invention relates to an extendible rod of a type which includes at least two rod-shaped elements slidable telescopically inside each other, and an expander device acting between said elements to extend said rod and lock said rod-shaped elements in the extended position, said expander device comprising:

a first constraint member attached to one of said rod-shaped elements;

a second constraint member slidable over the other of said rod-shaped elements;

stop means for stopping the sliding movement of said second constraint member on the corresponding rod-shaped element;

a linkage performing, between said constraint members, a first stroke to actuate said stop means and a second stroke to move said constraint members away from each other; and means of locking said linkage in a working position corresponding to a position of maximum separation of said constraint members from each other.

These rods are used as elements of modular assembly structures, or may be used for stands or supporting arrangements, especially in the photographic and movie fields, or for generic furnishings applications.

The rod is utilized by forcing its structure into a state of compression between two parallel walls through an expander device which acts between the rod-shaped elements in a direction tending to slide them off each other.

Currently known rods of this kind, while serving their intended function, have some drawbacks which complicate the operations for their installation, position setting, possible moving, and holding power against relatively compliant walls.

The last-mentioned drawback results from that a given rod should be adapted for installation between walls having different compliance characteristics. For instance, such a rod may be required to retain a firm position between reinforced concrete walls as well as between curtain walls of an exhibition booth, known for being more compliant than the former walls. The locking power in question is at all events dependent on the outward stroke of the expander device, which is to fill the conflicting demands for avoidance, with highly rigid walls, of an excessive compression on the rod-shaped elements and concurrent achievement of a secure locking where compliant walls are involved. Notice that an excessively long stroke of the expander device against highly rigid walls, in addition to involving a relevant physical effort to the installer, may harm the rod integrity.

Another limitation to known rods comes from that the linkage locking arrangement, made necessary by safety considerations and intended to prevent the rod-shaped elements from incidentally becoming loose on each other and the rod collapsing, usually requires that both hands be used for its actuation or release. This may occasionally make for difficult positioning of the rod when the latter is to be installed in hard-to-reach areas. The above two drawbacks are, of course, of greater consequence when they add together, such as where a rod with a relatively long stroke is to be fitted in an uncomfortable position between walls of low compliance.

SUMMARY OF THE INVENTION

The problem addressed by this invention is to provide an extendible rod which is both construction- and function-wise conceived to obviate the drawbacks with which the aforementioned prior art is beset.

This problem is solved, according to the invention, by an extendible rod as indicated being characterized in that said linkage includes means of adjusting extension through said second stroke.

BRIEF DESCRIPTION OF THE DRAWINGS

The features and advantages of the invention will become apparent from the following detailed description of a preferred, though not exclusive, embodiment thereof, being illustrated by way of example and not of limitation in the accompanying drawings, in which:

FIG. 1 is a partly cutaway front elevation view of an extendible rod according to the invention, shown at a first position setting thereof;

FIG. 2 is a partly cutaway front elevation view of a detail of the rod shown in FIG. 1;

FIG. 3 is a front elevation view of the detail marked by arrow III in FIG. 2;

FIGS. 4 and 5 are fragmentary side elevation views of the rod in the preceding figures, shown in two different operating conditions thereof;

DETAILED DESCRIPTION OF THE INVENTION

Figure 6:
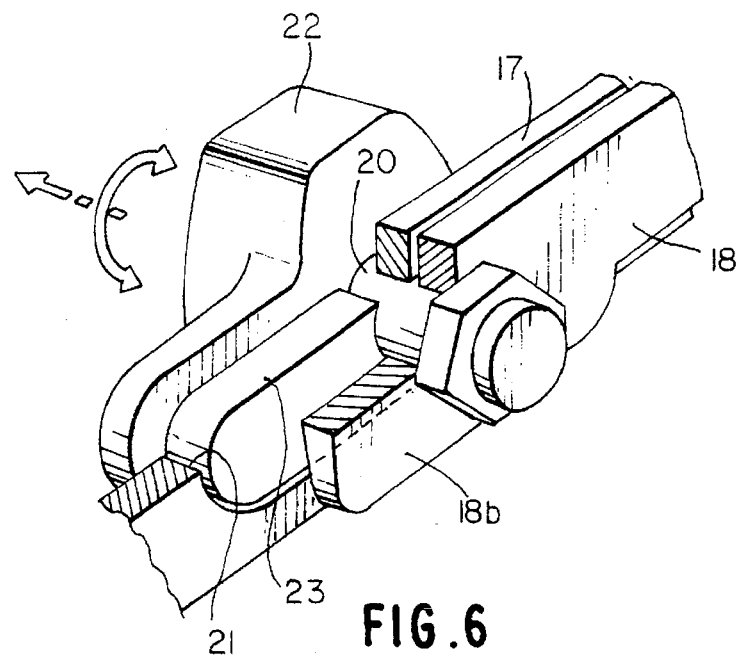
FIG. 6 is a partly cutaway perspective view of a detail of the rod in the preceding figures.
Figure 7:
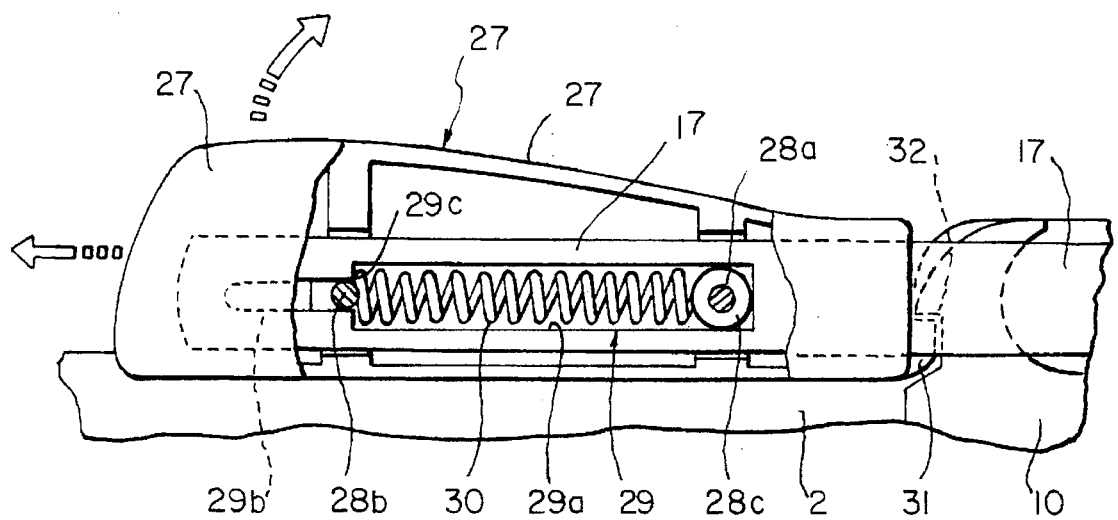
FIG. 7 is a partly cutaway side elevation view showing schematically a further detail of the rod in the preceding figures.

Generally shown at 1 in the drawings is an extendible rod embodying this invention. The rod 1 comprises two rod-shaped elements 2, 3 of tubular construction which can slide telescopically inside each other, and an expander device, generally shown at 4, for extending the rod and locking the rod-shaped elements in a desired extended position. Attached to one of the free ends of the rod 1, specifically to the free end of the rod-shaped element 3, is a spring-loaded foot 5 which functions to accommodate any variations in the distance between the walls against which the rod is thrusting when installed, and any variations in the rod extension, and/or to take up any excess pre-loading upon installation of the rod. Attached to the free end of the rod-shaped element 2 is a foot 5a which is not spring loaded. The foot 5 comprises two tubular bodies 6, 7, being engaged to slide on each other, and a spring 8 biasing said bodies 6, 7 away from each other. The element 7 has axially opposite ends 7a,b which are respectively turned inwards to form an abutment shoulder for the spring 8, and outwards into an abutment for the free end of the rod-shaped element 3. The element 6 has axially opposite ends 6a,b which are both turned outwards. The end 6a acts as an abutment stop for the end 7a of the element 7, whereas the end 6b forms a shoulder for a spacer 6c fitted sleeve-like over the element 6 to guide it inside the element 7, and against which the spring 8 acts. A pad 9 is fitted and held inside the element 6 which is adapted to contact one of the two surfaces between which the rod 1 would be clamped while in use.

The expander device 4 comprises first and second constraint members, indicated at 10 and 11, which are mounted on the first and the second rod-shaped elements 2, 3, respectively. Both constraint members 10, 11 are generally in the form of cylindrical sleeves slit along a generatrix line thereof, at which line said members 10, 11 are provided with respective flanges 10a,b and 11a,b. The first constraint member 10 is fastened to its corresponding rod-shaped element 2, e.g. by means of set screws 12 acting between the flanges 10a,b. The second constraint member 11 can be releasably clamped to, or alternatively set slidable on, its corresponding rod-shaped element 3. To facilitate the releasing and sliding of the element 3, compression coil springs 13 are arranged to bias the flanges 11a,b away from each other. To clamp the element 3 tight on its corresponding rod-shaped element, a link 14 is provided which also extends between said flanges 11a,b. The link 14 is associated with a pair of face cams 15, 16 respectively made rotationally rigid with the flange 11a and a lever 17, such that they can be rotated relative to each other as the lever 17 is turned. The pivotal movement of the latter occurs about the axis of the link 14, since this lever is pivoted on the second constraint member 11 through said link.

The lever 17 is a first class lever and belongs to a composite linkage which includes a connecting rod 18 whose big end 18a is secured slidably, as by means of a screw 19, in a slot 19a in the flange 10a of the first constraint member 10. The small end 18b of the connecting rod 18 is secured, as by a pin 20, at a corresponding additional slot 21 extending along the longitudinal direction of the lever 17 and being located a selected distance away from the link 14. Fitted in a spring-loaded manner over the pin 20 is a pawl 22 having a recess 22a which receives the head 24 of the pin sunk therein. On the opposite end, that is the end next to the lever 17, the pawl 22 has an elevation 23 which extends proximate to the pin 20 and matches the shape of the slot 21 to stop said pin sliding movement in said slot. Notice that with the elevation 23 engaged in the slot 21, two positions of the pin 20 relative to the lever 17 are defined which correspond to the positions where the pin 20 abuts either of the longitudinally opposite ends of said slot, respectively.

To shift the pawl 22 between the two positions shown, the elevation 23 is first disengaged from the slot 21 by sliding the pawl 22 along the pin 20 against the elastic bias of a coil spring 25 intervening between the head 24 and the bottom of the recess 23; the pawl 22 is then turned through 180° such that the elevation 23 will lie along the slot 21 with the pin 20 abutting either end of the slot.

Notice that this displacement of the pin 20 will cause the fulcrum of the lever 17 to be shifted, and accordingly, produce a different length of the working stroke C to be travelled by the constraint member 11 as explained hereinafter.

Attached to the remote free end of the lever 17 from the link 14, is a handgrip 27 including two cheek pieces 27a,b held together by screws or rivets 28a,b. At the location of said cheek pieces, the lever 17 end is formed with a longitudinally extending slot 29 having a first section 29a and a second section 29b in continuation of each other. A cylindrical lug 28c is guided in the section 29a which encircles the screw 28a. The section 29b has a screw or rivet 28b guided therein. A shoulder 29c is defined between the two sections against which a spring 30 reacts which is active on the lug 28c to bias the handgrip 27 toward the lever 17 end where it is pivoted on the second constraint member 11.

Notice that the cheek piece 27a has a hooking formation 31 adapted to engage by snap action with a corresponding hooking formation 32 provided on the first constraint member 10 proximate to the flange 10a.

From the working position shown in FIG. 1, where the lever 17 is locked in a position against the constraint member 10 by mutual engagement of the hooking formations 31 and 32 and the rod-shaped elements 2, 3 are locked in the extended position, the rod 1 can be taken down by just grasping the handgrip 27 with one hand and applying a pull in the direction tending to disengage the hooking formations 31, 32, thereby releasing the lever for rotation about the axis of the link 14. During the initial stage of that rotation between the position of FIG. 1 and that of FIG. 4, there only occurs a relative displacement of the constraint members from a position of maximum separation to one close against each other. The rod extension is, therefore, decreased by an equal extent to the approach stroke of the constraint members 10, 11. The relative rotation of the face cams 15, 16 is such that the second constraint member 11 will at all events be held firmly clamped to its corresponding rod-shaped element, to inhibit any relative sliding movement.

This setting is generally sufficient for small displacements of the rod 1 which would leave the span between the walls against which the rod is held unaffected. Such displacements can be effected to advantage with one hand only on the handgrip 27.

To adjust the rod 1 setting, the lever 17 is turned further about the axis of the pivot pin 14. For this purpose, the connecting rod big end 18a is caused to slide with respect to its corresponding constraint member by having the screw 19 shifted along the slot 19a. Thus, a relative rotation of the face cams 15, 16 is effected (FIG. 6) which, due to the cam profile shape, allows the constraint member 11 to be released (the action being assisted by the springs 13), and accordingly, the constraint member 11 to be slid relative to its corresponding rod-shaped element 3.

Thus, the extension of the rod 1 can be adjusted coarsely to suit the span between the walls against which the rod ends are to thrust.

According to the load requirements on the rod 1 and the structure of the walls between which it is to be installed, the user is enabled to preliminarly decide about a preferred extension stroke of the rod. For example, one may point the pawl 22 such that the pin 20 will abut the wall of the slot 21 next to the handgrip 27. In this way, the length of the separation stroke C between the constraint members, to be obtained by turning the lever to its working position (FIG. 2), will be maximal. Any excess length would be taken up by the foot 5 spring mount.

On the other hand, by so turning the pawl 22 (FIG. 1) as to have the pin 20 set close against the slot 21 on the link 14 side, the separation stroke C between the constraint members 10, 11 will be minimal.

Once the rod 1 is preset as desired, it will suffice that the lever 17 be turned to first lock the contraint member 11 against sliding movement on the rod-shaped element 3 (FIG. 4), and to produce by a second rotational stroke of the lever 17 the mutual separation of the two constraint members 10, 11 and consequent extension of the rod. This second stroke will be completed upon the hooking formations 31, 32 becoming re-engaged with each other to lock the lever 17 against incidental rotation.

Thus, the invention does solve the problem proposed and achieve a number of advantages over prior extendible rods.

Among these are easier locking of the expander device and rod handling, and the simple construction of the rod.

What is claimed is:

1. An extendible rod including at least two rod-shaped elements slidable telescopically inside each other, and an expander device acting between said elements to extend said rod and lock said rod-shaped elements in the extended position, said expander device comprising:

a first constraint member attached to one of said rod-shaped elements;

a second constraint member slidable over the other of said rod-shaped elements;

frictional clamping means for clamping said second constraint member on the corresponding rod-shaped element to prevent relative movement therebetween;

linkage means pivotally connected to said constraint members for pivotal movement in a first direction to release said clamping means to permit relative movement between said second constraint member and the corresponding rod-shaped element and pivotal movement in an opposite direction to clamp said second constraint member on the corresponding rod-shaped element and move said second constraint member away from said first constraint member; and means for locking said linkage in a working position corresponding to a position of maximum separation of said constraint members from each other.

2. An extendible rod according to claim 1, wherein said linkage comprises a first class lever having one end pivoted on one of said constraint members, another juxtaposed end defining a handgrip, and a pivot pin attached to the other constraint member by a connecting rod.

3. An extendible rod according to claim 2, wherein said pivot pin can be shifted along said lever.

4. An extendible rod according to claim 2, wherein said pivot pin is a pin through which one end of said connecting rod is attached to the lever, said pivot pin being engaged in a slot extending longitudinally of the lever, and means are provided on said lever for holding said pivot pin exchangeably proximate to either of the two longitudinally opposite ends of said slot.

5. An extendible rod according to claim 2, wherein said linkage locking means comprise a hooking formation on said handgrip for engagement with a corresponding hooking formation on one of the constraint members to lock said lever relative to the constraint members when said hooking formations are in a condition of mutual engagement, said handgrip being shiftable under spring load along said lever into and out of said condition of mutual engagement.

6. An extendible rod according to claim 5, wherein said handgrip is slidable within limits along said lever against a spring.

7. An extendible rod according to claim 1, wherein a spring-loaded foot is provided on at least one of the free ends of said rod-shaped elements.

8. An extendible rod according to claim 7, wherein said spring-loaded foot is coupled detachably to the end of a corresponding one of the rod-shaped elements.

* * * * *